United States Patent [19]
Kimoto

[11] Patent Number: 4,459,603
[45] Date of Patent: Jul. 10, 1984

[54] MECHANISM FOR URGING AN ELECTROSTATIC RECORDING MEDIUM TO A MULTI-STYLUS ELECTRODE HEAD

[75] Inventor: Toshifumi Kimoto, Kanagawa, Japan
[73] Assignee: Fuji Xerox Co., Ltd., Tokyo, Japan
[21] Appl. No.: 344,846
[22] Filed: Feb. 1, 1982
[30] Foreign Application Priority Data
Feb. 23, 1981 [JP] Japan .................................. 56-25312
[51] Int. Cl.³ ........................................... G01D 15/06
[52] U.S. Cl. ..................................................... 346/155
[58] Field of Search ................ 346/139 C, 153.1, 155; 101/DIG. 13

[56] References Cited
U.S. PATENT DOCUMENTS
3,693,181  9/1972  Marshall et al. ................. 346/139 C
4,315,270  2/1982  Lloyd et al. ........................... 346/155

FOREIGN PATENT DOCUMENTS
163591 12/1979 Japan .

Primary Examiner—Thomas H. Tarcza
Attorney, Agent, or Firm—Sughrue, Mion, Zinn, Macpeak and Seas

[57] ABSTRACT

A mechanism for urging an electrostatic recording medium towards a multi-stylus electrode head having needle type charge electrodes and auxiliary electrodes includes a base plate, an elastic member secured to the base plate, and a film-like substance covering the base plate and the elastic member. The width of the elastic member is greater than the width of the electrode head. The film-like substance protects the elastic member from being contaminated and reduces friction thereby increasing the operational life of the mechanism.

10 Claims, 6 Drawing Figures

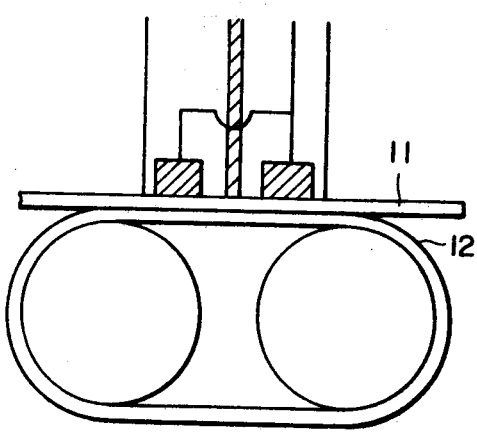
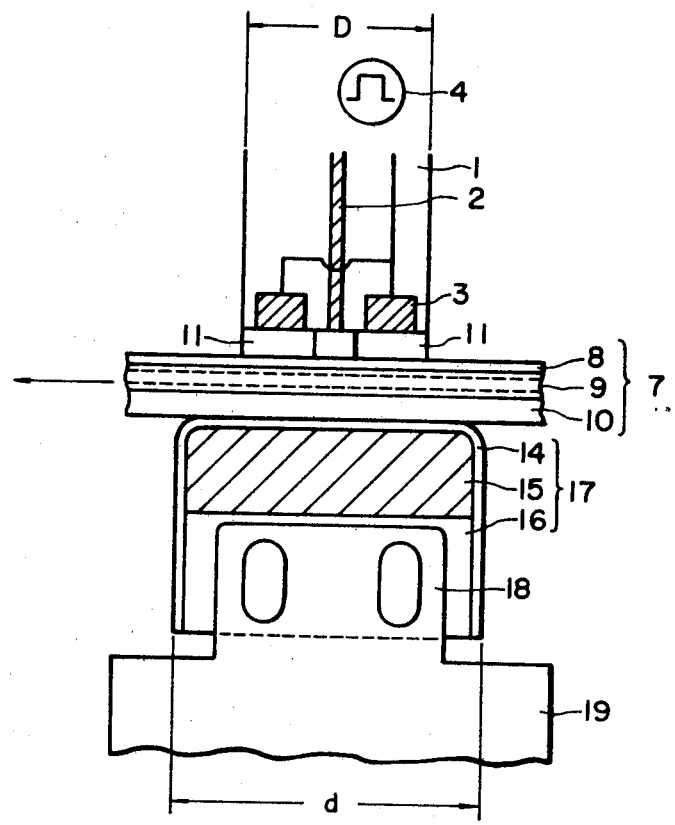

MECHANISM FOR URGING AN ELECTROSTATIC RECORDING MEDIUM TO A MULTI-STYLUS ELECTRODE HEAD

BACKGROUND OF THE INVENTION

1. Field of the Invention.

This invention relates to a mechanism for urging an electrostatic recording medium towards a multi-stylus electrode head in an ordinary paper, image-transcribing, electrostatic recording system. In such a system, electrostatic latent images are formed on the electrostatic recording medium by the multi-stylus type electrode head and the latent images are then developed, transferred on an ordinary paper sheet, and finally fixed.

2. Description of the Prior Art.

A conventional electrostatic recording system has recording styli arranged in one direction at a high density. High tension image signals are applied to the recording styli (charging electrodes) thus forming electrostatic latent images on an electrostatic recording medium in accordance with the image signals creating the electric charge. The electrostatic latent images thus formed on the electrostatic recording medium are then fixed.

In the conventional recording system, a so-called matrix driving is effectuated to reduce the voltage applied to the recording electrodes and also to reduce the driving drivers. For the realization of such a drive, auxiliary electrodes 3 are placed in the vicinity of the charging electrodes 2 as shown in FIG. 1 thus obtaining a multi-stylus electrode known as a Gould type.

In addition to the above described arrangement, there is an arrangement wherein auxiliary electrodes are provided on the other side of the electrostatic recording medium (recording paper) and this arrangement is known as a Philip type multi-stylus electrode.

In either of the above arrangements of the multi-stylus electrode, a gap of from 4 to 12 microns is always required between the charging electrodes 2 and the surface of the recording medium.

In order to maintain the above described gap, FIG. 2 shows a method wherein projections of about several microns are formed on the surface of the recording paper 5 and a rubber or sponge roller 6 is used to depress the recording paper 5 from the rear side thereof in order to urge the paper 5 to the multi-stylus electrode 1 while the projections insure that the required gap is maintained.

In addition to the above described method for directly forming images on the recording paper, image transferring recording methods have been recently developed wherein a recording medium 7 as shown in FIG. 3 is used. The recording medium 7 comprises a recording layer 8, an intermediate resistance layer 9, and a base layer 10. Electrostatic latent images are formed on the recording layer 8 and these images are developed by a xerographical method utilizing toner. The toner image is then transferred on an ordinary paper sheet and the image remaining on the recording layer 8 is cleaned so that the recording layer is ready for a subsequent recording operation.

The applicant of the present invention has previously proposed a method for maintaining the gap between the charge electrode 2 and the recording layer 8 as shown in FIG. 3. In FIG. 3 a coating 11 which is several microns thick is applied to a part of the electrode corresponding to the auxiliary electrodes. The coating 11 is not applied to the part corresponding to the charge electrode as explained in Japanese Patent Application No. 163591/1979).

In this method, since it is intended to maintain the gap by the thickness of the coating 11, it is required that the recording medium 7 be held in tight contact with the multi-stylus electrode assembly 1 along the entire surface of the length of the assembly. FIG. 4 is a perspective view showing the lengthwise part of the same assembly.

To maintain the recording medium in tight contact with the multi-stylus electrode assembly, a rubber roller and a sponge roller shown as reference numeral 6 in FIGS. 2 and 3 has been used. However, it has been found that with the hardness of the rubber rollers currently available on the market, it is impossible to provide uniform contact between the recording medium and the electrode assembly along the entire length of the latter.

The hardness of the sponge roller can be made lower than that of the rubber roller thus enabling one to provide the desired uniform contact between the recording medium and the electrode assembly along its entire length. In this case, however, it is required that the engaging portion between the two members has a width larger than that designated by D in the multi-stylus electrode assembly of FIG. 3 thus requiring an excessively large outer diameter of the sponge roller which is not desirable from the viewpoint of reducing the size of the overall apparatus.

Although the width of the engaging portion can be increased by increasing the urging force of the sponge roller toward the electrode assembly, such a procedure is not desirable because the excessive force required tends to shorten the operable life of the gap maintaining coating 11. A procedure utilizing an endless belt 12 instead of the rubber roller for increasing the width of the engaging portion is disclosed in Japanese Patent Laid-Open No. 1625/1979 and shown in FIG. 5. Although the width of the engaging portion itself can be somewhat increased, this procedure is not advantageous because it complicates the apparatus and makes it rather large thereby increasing the production cost of the apparatus.

SUMMARY OF THE INVENTION

An object of the present invention is to provide a mechanism for urging the electrostatic recording medium towards a multi-stylus electrode head which can eliminate all of the above described drawbacks of the conventional mechanisms.

Another object of the invention is to provide a mechanism for urging the electrostatic recording medium towards the multi-stylus electrode head wherein a gap between the electrode head and the electrostatic recording medium can be maintained without increasing the size, complicating the construction, and increasing the cost of the mechanism.

Still another object of the invention is to provide a mechanism for urging the electrostatic recording medium to the multi-stylus electrode head wherein the gap between the electrode head and the electrostatic recording medium can be maintained for a long period in a stable manner thereby enabling one to provide images of excellent quality, According to the present invention, a mechanism having a resilient structure provided on a side of the recording medium opposite to the multi-stylus electrode head for urging the electrostatic recording medium to the multi-stylus electrode head comprises a base plate, a sponge plate having a shorter side which is longer than the shorter side of the multi-stylus electrode head secured to the base plate, and a film member enveloping the sponge plate and the base plate in their entirety.

BRIEF DESCRIPTION OF THE DRAWINGS

FIG. 5 is an elevational diagram of an electrode head and a recording medium which is urged to the electrode head by an endless belt having elasticity; and FIG. 6 is en elevational diagram, partly in section, of an embodiment of the present invention.

DESCRIPTION OF THE PREFERRED EMBODIMENTS

Figure 1:
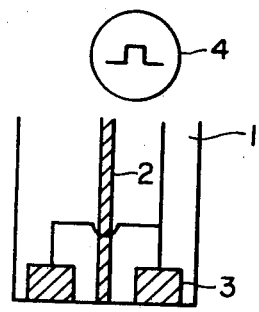
FIG. 1 is an elevational diagram, partly in section, of a Gould type (one-side control type) multi-stylus electrode head.
Figure 2:
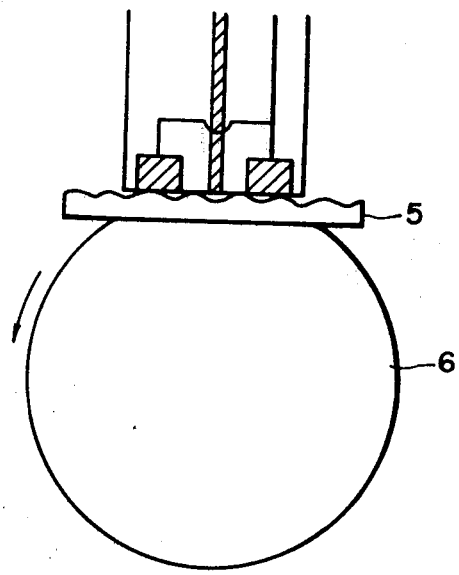
FIG. 2 is a diagram showing an electrostatic recording paper which is brought into contact with the Gould type electrode of FIG. 1 by a rubber roller placed on the rear side of the recording paper while maintaining a charge gap.

A mechanism for urging the electrostatic recording medium to the multi-stylus electrode head in accordance with the present invention will now be described in detail with reference to FIG. 6.

The urging mechanism 17 is located on a side of the electrostatic recording medium 7 opposite to the multi-stylus electrode head 1. In operation, the recording medium 7 passes through the interval formed between the elctrode head 1 and the mechanism 17 and the mechanism 17 urges the electrostatic recording medium 7 toward the multi-stylus electrode head 1.

The mechanism 17 itself comprises a base plate 16 made of a metal, plastic, glass, or other similar material; an elastic member 15 having a planar shape which is secured to the base plate 16; and a film-like substance 14 which covers the outer surfaces of the base plate 16 and the elastic member 15. The mechanism 17 is secured to a structural member 19 through elongated holes 18.

The width d of the mechanism 17 is selected to be larger than the width D of the multi-stylus elctrode head 1, the widths d and D being measured along the shorter sides of the respective memebers 17 and 1. Furthermore, the length of the mechanism 17 is selected to be equal to or larger than the length of the longer side of the multi-stylus electrode head 1.

The elastic member 15 in the mechanism 17 may be made of neoprene sponge, urethane sponge, silicone sponge, or the like with the sponge having a hardness less than 20°. The thickness of the elastic member 15 may be any suitable value capable of exhibiting the desired elasticity. The film-like substance 14 may be any suitable material similar to that of the base layer 10 of the recording medium 7, or a material having a low frictional coefficient against the base layer 10. For instance, polyester film, Teflon film, polypropylene film, or the like may be used for this purpose, and the thickness of the film 14 may be any suitable value capable of exhibiting the elasticity of the elastic member 15. For the purpose of facilitating the entrance of the recording medium 7 between the electrode head 1 and the mechanism 17, the elastic member 15 may be formed at the entrance side into a circular cross-sectional configuration.

In operation, the multi-stylus electrode head 1 is placed in opposition to the urging mechanism 17 through the interposition of the recording medium 7, and the positions of the head 1 and the mechanism 17 are further adjusted so that a gap in a range of from 4 to 12 microns is maintained between the charge electrode 2 and the recording layer 8 of the recording medium 7 owing to the coating 11. Image signals 4 in excess of a charge initiating voltage are applied to the charge electrode 2 so as to form electrostatic latent images corresponding to the image signals on the recording layer 8. The latent images are then xerographically developed by using a toner and the thus developed toner images are then transferred onto an ordinary paper sheet. After the transfer of the toner images, the recording medium 7 is cleaned for removing toner which remains thereon so that the recording medium 7 is ready for the next image forming cycle. In this operation, the cleaning of the recording medium 7 is important. To facilitate the cleaning procedure, the surface of the recording layer 8 is made smooth.

By the provision of the paper urging mechanism of this invention, the gap between the charge electrode 2 and the recording layer 8 can be made equal to the thickness of the coating 11 throughout the entire length of the multi-stylus electrode thus rendering a uniform electrostatic latent image having no "bit drop" along the entire image forming surface of the recording medium.

Furthermore, since a film-like substance such as Mylar is applied around the sponge 15, the frictional resistance force between the base layer 10 and the mechanism 17 can be reduced. The film-like substance also substantially limits the amount of strange substances such as toner or the like which come in contact with the sponge 15 during the long operational life of the system. When the toner or the like is deposited on the film-like substance, the film-like substance can be easily wiped clean by use of a solvent thus enabling one to maintain a stable charge for a long period of operation.

A practical example of the present invention will now be described with reference to FIG. 6.

A coating substance adapted for maintaining the charge gap was applied in a thickness of 9 microns on the auxiliary electrodes 3 of a Gould type multi-stylus electrode having a width of 15 mm and a length of 290 mm.

The electrode head was brought into contact with a recording medium 7 comprising a recording layer 8, an intermediate resistance layer 9, and a base layer 10 (consisting of Mylar film 75 microns thick so that the recording layer 8 was in direct contact with the electrode head 1.)

An urging mechanism was placed on the side of the recording medium 7 opposite to the charge electrode head 1. The urging mechanism comprised a base plate 16 made of aluminum; a sponge plate (made by Bridgestone Co., Everlite HR-50, having sponge hardness of 10) 300 mm long, 30 mm wide, and 10 mm thick which was bonded onto the surface of the base plate 16; and a Mylar film 50 microns thick which covered the entire surface of the base plate 16 and the sponge plate 15, the film being designed at 14. The urging mechanism 17 was located at a position so that the outer Mylar film 14 was in contact with the base layer 10 of the recording medium 7 and the recording medium 7 was urged by the urging mechanism 17 toward the charge electrode head 1 under a pressure of 10 g/cm$^2$.

The recording medium 7 was fed in one direction under the above described condition and an image signal approximately equal to +700 V was applied between the charge electrode 2 and the auxiliary electrodes 3 so as to form an electrostatic latent image corresponding to the image signal on the recording layer 8 of the recording medium 7. The latent image was developed by using toner and the toner image thus developed was transferred onto an ordinary copying paper sheet. After the image was transferred, the surface of the recording medium 7 was cleaned to remove remaining toner or the like.

The above described operation cycle comprising forming the latent image, developing the latent image, and transferring the developed image together with the cleaning operation was repeated 43,000 times (calculated after conversion to B4 size).

After the above described operation test, it was found that the degree of tight contact between the multi-stylus electrode head 1 and the recording medium 7 was not changed from the initial value (judged by "bit drop") and the image thus obtained was stable and had satisfactory uniformity.

When the number of cycles was increased to 50,000 a deposition of strange material such as toner was found on the surface of the Mylar film covering the sponge plate 15 and nonuniformity was found in a part of the transferred image. However, after cleaning the Mylar film by using acetone, the deposition of the strange material and the nonuniformity in the image was eliminated completely.

Figure 3:
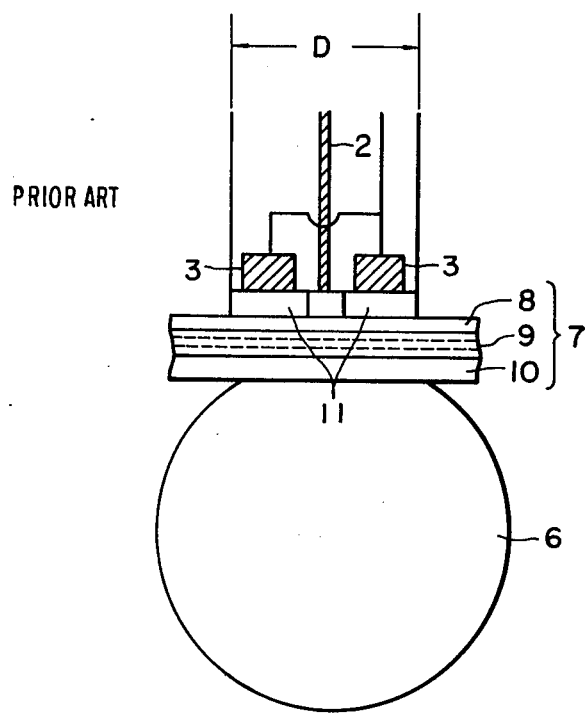
FIG. 3 is an elevational diagram, partly in section, of the Gould type electrode head and an electrostatic recording medium having a three layer construction wherein the recording medium is urged by a rubber or sponge roller toward the electrode head while a charge gap is maintained by a layer of a substance coated on a part of the auxiliary electrodes in the electrode head.
Figure 4:
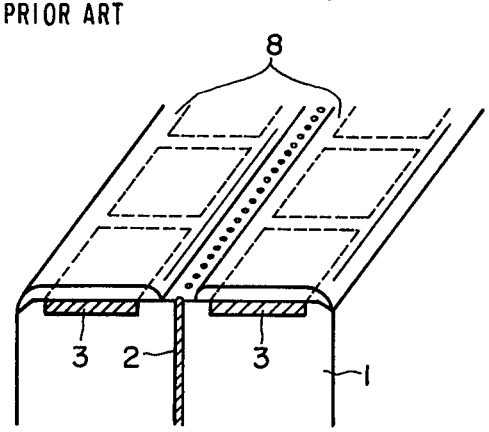
FIG. 4 is a perspective view of the multi-needle type electrode head showing discharge electrodes and the charge gap maintaining layer coated on a part of the auxiliary electrodes.

For purposes of comparison, a mechanism as shown in FIG. 3 was constructed utilizing a neoprene sponge roller 6 having a sponge hardness of 20° and an outer diameter of 38 mm. For this construction, when it is desired to obtain image quality comparable with the above described practical example, a pressure approximately equal to 30 g/cm$^2$ was found essential. When the operation cycle comprising forming a latent image, developing the latent image, transferring the developed image, and cleaning the recording medium was repeated approximately 5,000 times under the above mentioned pressure, the coating 11 for maintaining the charge gap was found to be worn out rendering the formation of the latent image impossible.

Furthermore, it was found that a roller of more than 50 mm in diameter must be used for obtaining a satisfactory image while using a sponge hardness and an urging pressure similar to those in the practical example. Such a great diameter is not desirable since the size of the system is unduely large.

When the Mylar film covering the sponge plate 15 was omitted, severe deposition of toner and the like was found on the sponge plate 15 and "bit drop" occurred after 1,000 cycles of operation. After these operation cycles, a strange substance such as toner intruded into the sponge plate thereby increasing the sponge hardness in excess of 20°. It is of course impossible to remove the strange substance from the sponge plate utilizing a solvent.

The mechanism according to this invention has the following advantageous features:

(1) Since the elastic member is formed into a substantially planar shape, tight contact between the electrode head and the recording medium can be easily achieved using a smaller urging force.

(2) Since a substantial part of the elastic member is covered by a Mylar film, the frictional force between the elastic member and the recording medium can be reduced and the deposition of strange substances such as toner on the Mylar film can be prevented. When strange substances are deposited on the Mylar film, the substances can be easily removed by a solvent. Furthermore, the deformation of the elastic member due to urging the recording medium can be reduced by the presence of the Mylar film and the deformation thus reduced is made uniform.

(3) The size of the entire apparatus utilizing this mechanism can be substantially reduced and the tight contact between the recording medium and the multi-stylus type electrode head can be assured for a long period of operation.

We claim:

1. An electrostatic recording device, comprising:
   an electrostatic head having charge electrodes, said charge electrodes being adjacent to a first side of an electrostatic recording medium being conveyed past said head;
   a layer of material formed on said head for creating a charge gap between said charge electrodes and said recording medium;
   auxiliary electrodes cooperating with said charge electrodes;
   a mechanism located on a second opposite side of said electrostatic recording medium opposite said head urging said recording medium towards said head to maintain said charge gap constant; and
   said mechanism including an elastic member having a flat continuous planar upper surface adjacent said second side of said recording medium, a continuous film-like substance covering said continuous planar upper surface of said elastic member, a length of said planar upper surface and said film-like substance being greater than a length of a longer side of said head.

2. The mechanism claimed in claim 1 wherein said base plate is made of metal.

3. The mechanism claimed in claim 1 wherein said base plate is made of a plastic material.

4. The mechanism claimed in claim 1 wherein said base plate is made of a glass material.

5. The mechanism claimed in claim 1, wherein said elastic member has a planar shape.

6. The mechanism claimed in claim 1 wherein said elastic member is made from a material selected from a group consisting of neoprene sponge, urethane sponge and silicone sponge, said elastic member material having a hardness less than 20°.

7. The mechanism claimed in claim 6 wherein said film-like sustance is made from a material selected from the group consisting of polyester, Teflon, Mylar and polypropylene, said film-like substance material having an elasticity similar to that of said elastic member, a frictional resistance between said recording medium and said film-like substance being lower than the frictional resistance force between said recording medium and said elastic member.

8. The mechanism claimed in claim 7 wherein said elastic member has a circular cross-sectional configuration at an entrance side of said mechanism.

9. The mechanism claimed in claim 1 wherein said layer is between 4 and 12 μm thick.

10. The device as claimed in claim 1, wherein said auxiliary electrodes are disposed adjacent said charge electrodes and on said first side of said recording medium, said layer being formed on said auxiliary electrodes.

* * * * *